May 30, 1967 A. C. CARNEY 3,322,902
TELEPHONE SUBSCRIBER'S LINE CIRCUIT
Filed Dec. 23, 1963
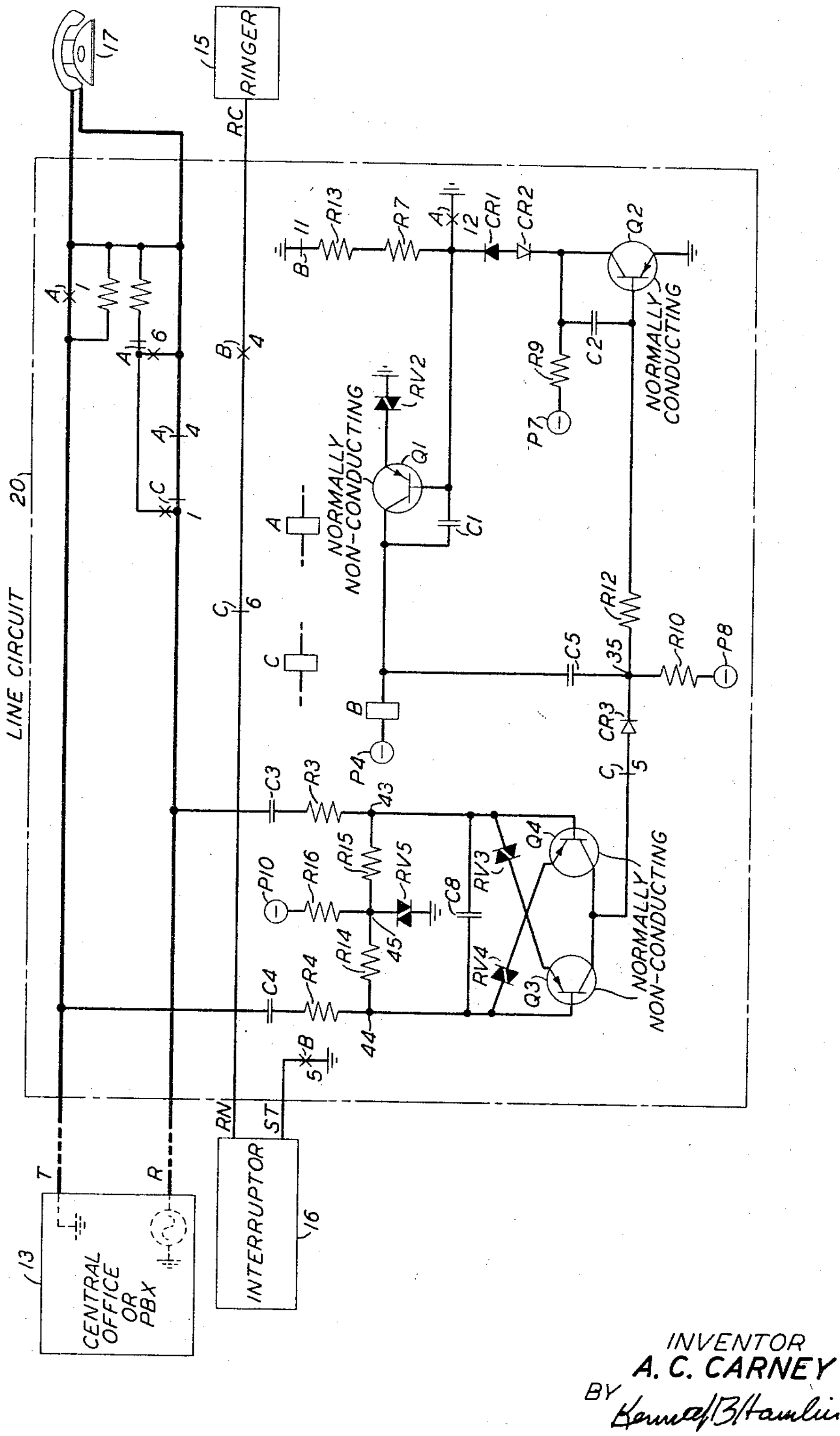
INVENTOR
A. C. CARNEY
BY Kenneth B. Hamlin
ATTORNEY

United States Patent Office 3,322,902 Patented May 30, 1967

3,322,902

TELEPHONE SUBSCRIBER'S LINE CIRCUIT

Adam C. Carney, Matawan, N.J., assignor to Bell Telephone Laboratories, Incorporated, New York, N.Y., a corporation of New York Filed Dec. 23, 1963, Ser. No. 332,599
8 Claims. (Cl. 179—84)

This invention relates to communication systems and more particularly to improvements in communication or telephone subscribers' line circuits and ringing detector circuits therein.

Telephone line circuits are employed to perform various control and supervisory functions incident to the establishment of a connection between a common switching point, such as a central office or PBX, and one or more telephone subsets at a subscriber's premises. One of the functions typically performed by a telephone line circuit involves signaling a particular subscriber station in response to the detection of a ringing signal from the central office or PBX switching point. The ringing signal from the switching point may be utilized directly to operate a local ringer at the subscriber station, or it may be detected by a ringing detector arrangement in the line circuit which in turn extends ringing current from a local source to the ringer. The latter arrangement is employed to advantage, for example, in key telephone systems in which more than one subset is usually signaled incident to an incoming call.

Line circuits find such extesive use in telephone systems that necessarily the cost, size and complexity thereof are of prime consideration. For this reason efforts have been directed toward reducing the number of components required in an individual line circuit and toward the use of electronic components therein. Such efforts have been successful in many respects resulting in considerable savings. However, in other respects such attempts in the prior art have been successful only at the expense of circuit versatility or reliability, or they have failed to provide an adequate solution to existing problems. In particular, known ringing detector arrangements have been found to have certain shortcomings and disadvantages where the telephone lines are subject to inductive interference fields, alternating current earth potentials and other like disturbances. These disturbances, often referred to as longitudinal disturbances, produce currents in the line conductors which tend to falsely operate the ringing detector to initiate ringing operation.

A general object of the present invention is to overcome certain of the disadvantages and shortcomings of known ringing detector arrangements.

More particularly, an object of this invention is to provide a ringing detector arrangement which is insensitive to the effects of longitudinal disturbances due to inductive interference fields, earth potentials and the like.

Another object of this invention is to provide a simple, compact and economical electronic ringing detector arrangement which is reliable in operation and which is insensitive to longitudinal line disturbances.

In accordance with a feature of the present invention the above and other objects are attained in an illustrative embodiment of a ringing detector circuit wherein the individual line conductors are each connected via respective impedances to a point of reference potential. Signals developed across each of the impedances due to signals appearing on the respective line conductors are applied to a difference gating arrangement, the output of which is connected to circuitry for initiating local ringing operation. When a ringing signal is applied to one of the line conductors, the signals developed across the respective impedances differ in magnitude sufficiently to operate the gating arrangement and extend the ringing signal therethrough to the output.

However, the appearance of similar signals on both of the line conductors, such as would appear when the line is subject to an inductive interference field or to alternating current earth potentials, results in the development of signals across the respective impedances which are substantially similar in magnitude. Accordingly, the difference gating arrangement is not operated and no signal is transmitted to the circuitry for initiating local ringing. Such longitudinal disturbances on the line are thus prevented from falsely operating the ringer.

In accordance with another feature of the present invention the difference gating arrangement employs a pair of transistors connected to the respective impedances. The emitter of one transistor and the base of the other transistor are connected in common to one of the impedances; and similarly, the emitter of the other transistor and the base of the one transistor are connected in common to the other of the impedances. The collectors of the transistors are connected to the output of the gating arrangement. Thus the transistors are normally biased in a nonconducting state by the reference potential to which the impedances are connected. They remain in a nonconducting stage except in the presence of signals of substantially different magnitude developed across the respective impedances.

The above and other objects and features of this invention may be fully apprehended from the following detailed description when considered with reference to the accompanying drawing which shows an illustrative embodiment of the present invention.

In the drawing, subscriber's subset 17 is connected via line circuit 20 and line conductors T and R to a central office or PBX designated 13. Line circuit 20 also interconnects interruptor 16, which may be situated at the location of line circuit 20, and local ringer 15. The illustrative embodiment of the present invention shown in the drawing is depicted in a key telephone subscriber's line circuit of the type disclosed and described in C. E. Morse-J. P. Smith patent application Ser. No. 246,905, filed Dec. 26, 1962, now Patent 3,239,610 issued Mar. 8, 1966. However, it will be apparent from the description herein that the principles of the present ringing detector arrangement may be employed advantageously in other known communication or telephone subscriber's line circuits. For the purposes of clarity and to facilitate description of the present invention, only those portions of line circuit 20 deemed necessary to a complete understanding of this invention are shown in the drawing. Relays A and C in line circuit 20 control the connection of subset 17 to line conductors T and R, which operation forms no part of the present invention and is described in detail in the above-mentioned patent application. Relay B in combination with relay C controls the interconnection of interruptor 16 and local ringer 15. The operation of relay B is controlled in turn by the ringing detector arrangement comprising transistors Q1, Q2, Q3 and Q4 and their associated circuit components.

When an idle circuit condition exists, transistors Q1, Q3 and Q4 are each in a nonconducting state, transistor Q2 is in a conducting state, and relays A, B and C are in the unoperated condition. Transistor Q1 is maintained in a nonconducting state by ground potential provided to the base thereof through break contact 11 of relay B and resistors R13 and R7. Transistor Q2 is maintained in a conducting state by source P8 which supplies current through resistors R10 and R12 to the base of transistor Q2. The conduction of transistor Q2 shunts source P7 to ground through resistor R9 and the collector-emitter path of transistor Q2.

Line conductors T and R are individually connected through respective capacitors C4 and C3, respective resistors R4 and R3, and respective resistors R14 and R15 to a point of reference potential 45. Capacitors C3 and C4 provide direct current isolation between line conductors T and R and the ringing detector arrangement. Point 45 is connected to source P10 through resistor R16 and to ground through varistor RV5, the potential at point 45 being limited by varistor RV5 to some predetermined reference potential, for example 15 volts. Point 43, in circuit between resistors R3 and R15, is connected directly to the base of transistor Q4 and through varistor RV3 to the emitter of transistor Q3. Similarly, point 44, in circuit between resistors R4 and R14, is connected directly to the base of transistor Q3 and through varistor RV4 to the emitter of transistor Q4. Points 43 and 44 are interconnected via high-frequency bypass capacitor C8.

The collectors of transistors Q3 and Q4 are connected in common through break contact 5 of relay C and diode CR3 to point 35, which is in circuit between resistors R10 and R12. The base current of transistor Q2 over the path above-traced through resistors R10 and R12 maintains point 35 at a slightly negative potential, on the order of several volts in magnitude, during the idle circuit condition. The potential at point 45 is advantageously negative with respect to the potential at point 35, reverse biasing diode CR3 during the idle circuit condition to preclude the flow of leakage current through transistors Q3 and Q4 to the bias network of transistor Q2.

Point 35 is connected through capacitor C5 to the winding of relay B and to the collector of transistor Q1. The emitter of transistor Q1 is connected to ground through varistor RV2, and the base thereof is connected to ground through resistors R7 and R13 and break contact 1 of relay B. The base of transistor Q1 is also connected via breakdown diode CR1 and diode CR2 through resistor R9 to source P7. Diode CR1 breaks down to a conducting state when subjected to potential of a predetermined magnitude, which may be on the order of six volts for example. Since transistor Q2 is in a conducting state during the idle circuit condition, the potential applied to diode CR1 is insufficient to effect its breakdown.

Assume now that a ringing signal is applied to one of line conductors T and R from central office 13, for example line conductor R as shown in the drawing. Ground is connected to the other line conductor, such as line conductor T. The alternating current component of the ringing signal on line conductor R is directed through capacitor C3, resistor R3, point 43, resistor R15 to point 45 and varistor RV5, and on through resistors R14 and R4 and capacitor C4 to line conductor T. The potential at point 45, it will be recalled, is limited by varistor RV5 to some predetermined magnitude which is applied through resistor R14 to the base of transistor Q3. The ringing signal potential developed at point 43 by the voltage divider action of resistors R3 and R15 is provided through varistor RV3 to the emitter of transistor Q3. Transistor Q3 is thus caused to conduct to extend the positive portions of the ringing signal therethrough and through break contact 5 of relay C and diode CR3 to point 35, and thus to capacitor C5. Capacitor C5 is charged by these positive ringing pulses, raising the potential at point 35 in a positive sense from its normally negative potential. As capacitor C5 continues to charge, point 35 swings sufficiently positive to cause transistor Q2 to switch to a nonconducting state. The switching time of transistor Q2 is increased by capacitor C2 interconnecting the base and collector of transistor Q2. This delay, coupled with the time required to charge capacitor C5, provides protection against false operation of the ringing detector due to transients.

As transistor Q2 ceases to conduct, the collector thereof becomes negative in potential due to source P7. When the negative potential provided by source P7 through resistor R9 and diode CR2 to breakdown diode CR1 increases to a level sufficient to effect breakdown of diode CR2, direct current from source P7 is extended therethrough to the base of transistor Q1. Transistor Q1 is thus switched to a conducting state to complete the operating path for relay B, this path being traced from source P4 through the winding of relay B, the collector-emitter path of transistor Q1 and varistor RV2 to ground. Relay B is energized, contact 11 thereof operating to remove the ground path from the base of transistor Q1. Contact 5 of relay B operates to extend ground over start lead ST to start the operation of interruptor 16. Responsive thereto, interruptor 16, which may employ any of the known equipment for providing desired interruption rates for audible signaling, supplies local ringing current on lead RN. The ringing current on lead RN is extended through break contact 6 of relay C and operated contact 4 of relay B over lead RC to operate local ringer 15.

Transistor Q1 remains conducting, transistor Q2 remains nonconducting and relay B is maintained operated until the call is answered or timed out. If the call is answered, for example, relays A and C are energized, contact 6 of relay C operating to break the local ringing current path. Contact 5 of relay C operates to break the path between point 35 and the collectors of transistors Q3 and Q4. Contact 12 of relay A operates to connect ground to the base of transistor Q1, causing transistor Q1 to switch to a nonconducting state. Capacitor C5 discharges, and as point 35 is thus returned to a negative potential, transistor Q2 is switched to a conducting state. The return of transistor Q1 to a nonconducting state releases relay B, returning the ringing detector arrangement to the idle circuit condition.

Thus, to recapitulate briefly, when a ringing signal is applied to one of line conductors T and R, it appears across a respective one of resistors R14 and R15 connected thereto. The positive half-cycles of the ringing signal are applied through a respective one of transistors Q3 and Q4 and through diode CR3 to capacitor C5. Capacitor C5 is charged, switching transistor Q2 to a nonconducting state, which in turn switches transistor Q1 to a conducting state to energize relay B and initiate local ringing operation.

As mentioned above, prior ringing detector arrangements have produced false and improper ringing operation where the line conductors T and R are subject to inductive interference, earth potentials or the like which produce longitudinal disturbances on the line. However, the present ringing detector arrangement is insensitive to the effects of longitudinal disturbances on the line. Longitudinal signals induced in line conductors T and R, for example, produce substantially equal and opposing voltages across resistors R14 and R15. As a result the net base-emitter voltage applied to each of transistors Q3 and Q4 is such that they both remain in the nonconducting state, preventing the induced signal from falsely operating the ringing detector.

Further, if the resistance presented by resistors R3 and R4 is large with respect to the resistance of resistors R14 and R15, this factor coupled with the self-biasing effect of varistors RV3 and RV4 permits transistors Q3 and Q4 to remain insensitive to longitudinal signals on line conductors T and R even though the magnitude of the signal on one line conductor is somewhat greater than the magnitude of the signal on the other line conductor. For example, in one illustrative embodiment wherein the ratio of resistors R3 and R4 to resistors R14 and R15 was 30-to-1, with a normal ringing signal greater than forty volts, it was found that a difference of up to twenty volts could be tolerated in the magnitude of the longitudinal disturbances appearing on the respective line conductors T and R without incurring false ringing. The ratio of resistors R3 and R4 to resistors R14 and R15 is limited principally by the speed with which the ringing detector must respond to a ringing signal.

Additional protection against false ringing operation due to high frequency voltages induced in the line or resulting from earth potentials is afforded by bypass capacitor C8 interconnecting points 43 and 44. Further, the interconnection of transistors Q3 and Q4 is such that each transistor protects the other from large reverse junction voltages due to lightning or to large inductive transients from the central office.

It is to be understood that the above-described arrangements are merely illustrative of the principles of the present invention. Numerous other arrangements may be devised by those skilled in the art without departing from the spirit and scope of the invention.

What is claimed is:

1. In a communication system, a subscriber's line comprising a pair of line conductors, a subscriber's line circuit connected to said line for detecting ringing signals over said line conductors, a point of reference potential, impedance means at said line circuit individually connecting each of said line conductors to said point of reference potential, a difference gating arrangement having two inputs and an output, means for interconnecting said impedance means and said inputs of said difference gating arrangement, and means connected to said output of said difference gating arrangement for initiating local station ringing.

2. In a communication system, a subscriber's line comprising a pair of line conductors, individual impedance means respectively connecting each of said line conductors to a common reference point, means for limiting the potential at said common reference point to a predetermined magnitude, a gating circuit, means for providing signals developed across said individual impedance means to said gating circuit, means for initiating local station ringing, and means including said gating circuit responsive only to signals of different magnitude developed across respective ones of said impedance means for operating said initiating means.

3. In a telephone system, a subscriber's line circuit comprising two line conductors, a source of reference potential, first impedance means connecting one of said line conductors to said source, second impedance means connecting the other of said line conductors to said source, means operative to initiate local ringing, and means including a gating arrangement connected to said impedances and responsive to a different in potential changes across said first and said second impedances for operating said initiating means, said operating means being nonresponsive to substantially similar potential changes across said impedances.

4. In a telephone system, a subscriber's line comprising a pair of line conductors, means responsive to a ringing signal for initiating local ringing, a point of reference potential, first impedance means connecting one of said line conductors to said point of reference potential, second impedance means connecting the other of said line conductors to said point of reference potential, a gating circuit having two input terminals and one output terminal and responsive to the application of signals of differing magnitudes to said two input terminals for providing a conductive path from one of said input terminals to said output terminal, means for applying signals appearing across said first impedance means to one of said input terminals of said gating circuit, means for applying signals appearing across said second impedance means to the other of said input terminals of said gating circuit, means connecting said output terminal of said gating circuit to said initiating means, and means for applying a ringing signal to one of said line conductors.

5. In a telephone system in accordance with claim 4, said gating circuit comprising a pair of transistors individually associated with said first and said second impedance means, means individually connecting each of said transistors between a respective one of said input terminals and said output terminal, and means including said point of reference potential for normally biasing both of said transistors in a nonconducting state.

6. In a telephone system, a subscriber's line comprising a pair of line conductors, output utilization means, a gating arrangement interconnecting said line and said output utilization means comprising a pair of transistors individually associated with respective ones of said line conductors, means for providing signals appearing on individual ones of said line conductors to said transistor associated therewith, and means for maintaining both of said transistors in a nonconducting state except in the presence of signals on only one of said line conductors, said maintaining means including means interconnecting said transistors such that signals appearing on one of said line conductors in the absence of signals on the other of said line conductors switches said transistor associated with said one line conductor to a conducting state to provide a conductive path between said one line conductor and said output utilization means.

7. In a telephone system, a transmission path comprising first and second line conductors, means responsive to ringing signals for initiating local signaling, a first transistor having its emitter-collector path connected between said first line conductor and said initiating means and having its base connecting to said second line conductor, a second transistor having its emitter-collector path connected between said second line conductor and said initiating means and having its base connected to said first line conductor, means for maintaining both of said first and second transistors in a nonconducting state in the presence of substantially similar signals appearing on said first and said second line conductors, and means for applying ringing signals to one of said line conductors to switch said transistor having its emitter-collector path connected to said one line conductor to a conducting state to provide a conductive path for said ringing signals between said one line conductor and said initiating means.

8. In a telephone system in accordance with claim 7, said maintaining means comprising a first impedance connected between said base of said one transistor and a point of reference potential, and a second impedance connected between said base of said second transistor and said point of reference potential.

References Cited

UNITED STATES PATENTS

| | | | |
|---|---|---|---|
| 2,875,279 | 2/1959 | Dunlap | 179—86 |
| 2,953,646 | 9/1960 | Gerkensmeier | 179—86 |
| 3,218,478 | 11/1965 | Bernfeld et al. | 307—88.5 |

OTHER REFERENCES

Pages 90–91, 1963—Siegel: "Understanding Digital Computers," John Wiley and Sons.

KATHLEEN H. CLAFFY, *Primary Examiner.*

H. ZELLER, *Assistant Examiner.*